(12) United States Patent
Neyer et al.

(10) Patent No.: US 11,808,967 B2
(45) Date of Patent: Nov. 7, 2023

(54) LIGHT DEFLECTING DEVICE, LIGHTING DEVICE AND USE

(71) Applicants: Andreas Neyer, Iserlohn (DE); Helmut Frank Ottomar Müller, Düsseldorf (DE)

(72) Inventors: Andreas Neyer, Iserlohn (DE); Helmut Frank Ottomar Müller, Düsseldorf (DE)

(73) Assignee: temicon GmbH, Dortmund (DE)

( * ) Notice: Subject to any disclaimer, the term of this patent is extended or adjusted under 35 U.S.C. 154(b) by 0 days.

(21) Appl. No.: 16/376,782

(22) Filed: Apr. 5, 2019

(65) Prior Publication Data

US 2019/0235153 A1    Aug. 1, 2019

Related U.S. Application Data

(63) Continuation of application No. PCT/EP2017/075215, filed on Oct. 4, 2017.

(30) Foreign Application Priority Data

Oct. 5, 2016  (DE) .................... 10 2016 118 884.0

(51) Int. Cl.
*G02B 6/42* (2006.01)
*F21V 8/00* (2006.01)
*G02B 27/09* (2006.01)

(52) U.S. Cl.
CPC ......... *G02B 6/0068* (2013.01); *G02B 6/0036* (2013.01); *G02B 6/4214* (2013.01); *G02B 27/0961* (2013.01); *G02B 27/0972* (2013.01)

(58) Field of Classification Search
CPC ... G02B 6/0068; G02B 6/0036; G02B 6/4214
See application file for complete search history.

(56) References Cited

U.S. PATENT DOCUMENTS

| | | | | |
|---|---|---|---|---|
| 6,011,602 A * | 1/2000 | Miyashita | ............ | G02B 6/0061 349/65 |
| 6,264,343 B1 * | 7/2001 | Miyashita | ............ | G02B 6/0036 362/23.15 |
| 6,396,636 B2 * | 5/2002 | Sawaki | .................. | G02B 3/005 348/E9.024 |
| 6,425,673 B1 | 7/2002 | Suga et al. | | |
| 6,582,091 B2 * | 6/2003 | Funamoto | ............ | G02B 6/0073 362/601 |

(Continued)

FOREIGN PATENT DOCUMENTS

| | | |
|---|---|---|
| CN | 104603528 A | 5/2015 |
| CN | 104777554 A | 7/2015 |

(Continued)

*Primary Examiner* — Fatima N Farokhrooz
(74) *Attorney, Agent, or Firm* — Reinhart Boerner Van Deuren P.C.

(57) ABSTRACT

A light deflecting device including a flat, transparent light guide, and a transparent cover layer which is applied to the light guide at least partially in a flat manner. A microstructure for outcoupling light coupled into the light guide is formed between the light guide and the cover layer and the microstructure has a plurality of structural elements which are formed as substantially circular cylindrical elevations. A lighting device and the use of the light deflecting device or lighting device are also disclosed.

15 Claims, 6 Drawing Sheets

(56) References Cited

U.S. PATENT DOCUMENTS

| | | | |
|---|---|---|---|
| 6,648,485 B1* | 11/2003 | Colgan | G02B 6/0016 362/331 |
| 7,903,194 B2* | 3/2011 | Epstein | G02F 1/1335 349/64 |
| 9,261,639 B1* | 2/2016 | Tuohioja | G02B 6/0036 |
| 9,594,194 B2* | 3/2017 | Asaoka | G02B 5/00 |
| 10,012,783 B2* | 7/2018 | Boonekamp | G02B 6/0068 |
| 2003/0206408 A1* | 11/2003 | Funamoto | G02B 6/0036 362/603 |
| 2005/0110989 A1* | 5/2005 | Schermer | G01N 21/553 356/246 |
| 2008/0225393 A1* | 9/2008 | Rinko | G02B 6/0038 359/571 |
| 2008/0303180 A1 | 12/2008 | Lee et al. | |
| 2010/0225993 A1* | 9/2010 | Cho | G02B 6/0035 359/292 |
| 2011/0090696 A1* | 4/2011 | Nagai | H01L 33/505 362/293 |
| 2012/0140518 A1* | 6/2012 | Solomon | C03B 11/082 362/607 |
| 2014/0140091 A1* | 5/2014 | Vasylyev | G02B 6/0085 362/606 |
| 2014/0198531 A1* | 7/2014 | Iwasaki | G02B 6/0061 362/621 |
| 2014/0226361 A1* | 8/2014 | Vasylyev | F21V 7/0091 362/606 |
| 2015/0049511 A1* | 2/2015 | Tarsa | F21S 8/04 362/611 |
| 2015/0192742 A1 | 7/2015 | Tarsa et al. | |
| 2015/0277024 A1 | 10/2015 | Hsu et al. | |
| 2016/0062025 A1 | 3/2016 | Chambers et al. | |
| 2016/0085016 A1* | 3/2016 | Ito | H04N 1/0284 358/484 |
| 2017/0192166 A1* | 7/2017 | Hsieh | G02B 6/0016 |
| 2018/0074250 A1* | 3/2018 | Boonekamp | G02B 6/0038 |

FOREIGN PATENT DOCUMENTS

| | | | |
|---|---|---|---|
| CN | 104948997 A | 9/2015 | |
| DE | 10 2008 055 857 | 5/2010 | |
| DE | 10 2012 215 640 | 3/2014 | |
| EP | 2 894 396 | 7/2015 | |
| EP | 2894396 A1 * | 7/2015 | G02B 6/0065 |
| JP | H06 324331 | 11/1994 | |
| JP | 2001-093314 A | 4/2001 | |
| JP | 2001-504598 A | 4/2001 | |
| JP | 2004-527676 A | 9/2004 | |
| JP | 3632208 B2 | 1/2005 | |
| JP | 2009-043706 A | 2/2009 | |
| JP | 2010-050100 A | 3/2010 | |
| JP | 2011-515848 A | 5/2011 | |
| KR | 10-2015-0076550 A | 7/2015 | |
| WO | WO 02/081844 | 10/2002 | |

* cited by examiner

LIGHT DEFLECTING DEVICE, LIGHTING DEVICE AND USE

CROSS-REFERENCE TO RELATED PATENT APPLICATIONS

This patent application is a continuation of PCT/EP2017/075215, filed Oct. 4, 2017, which claims priority to German Application No. 10 2016 118 884.0, filed Oct. 5, 2016, the entire teachings and disclosure of which are incorporated herein by reference thereto.

FIELD

The present invention concerns a light deflecting device, a lighting device and their uses.

BACKGROUND

Devices for deflecting light to achieve the best possible glare-free interior lighting of rooms are known from the prior art. For example, the German patent specification DE 10 2008 055 857 B4 contains a known light deflecting device consisting of a transparent plate or film with a prism-shaped lens profile on one side and a cylindrical lens profile on the other. In this case, the purpose of the light deflecting device is to optimise the utilisation of daylight falling on a window surface. In this connection, the task of such systems is to redirect the incident daylight in side-exposed rooms in such a way that better illumination of the room depth is achieved.

Such devices can indeed improve the utilisation of daylight. However, the use of artificial light sources is necessary if sufficient daylight is not available.

For this purpose, light can be incoupled via the edge of a flat, transparent light guide, which can be, for example, a window pane or a part thereof, and then outcoupled again in a planar manner via a specific surface structure. Specific surface structures must be provided for this purpose. In order not to impair transparency (especially with window panes) and to simultaneously achieve homogeneous light outcoupling, the structures are provided as microstructures.

On the one hand, the surface structure can be created by modifying the surface of the light guide itself. However, this means that existing light guides (such as existing window panes) would have to be replaced or additional light guides (such as an additional pane) placed in front of them. Alternatively, it is conceivable that a plate or film is applied to an already existing light guide.

However, the delicate microstructure must be protected from dirt and damage (e.g. by surface cleaning). For this purpose it may be necessary to provide a further protective layer which is applied to the microstructure. Alternatively, it is conceivable to protect the microstructure by inserting the light guide with the surface comprising the microstructure into an intermediate space of a multiple glazing. However, this entails additional effort during installation.

Based on this, one of the tasks of the invention is to propose light deflecting devices and lighting devices which, in particular, have a high degree of durability with high transparency and are nevertheless as economical as possible to install.

BRIEF SUMMARY

According to a first aspect of the invention, a light deflecting device is described comprehensively: a flat, transparent light guide, and a transparent cover layer applied to the light guide in a planar manner at least partially, wherein a microstructure is formed between the light guide and the cover layer for outcoupling light coupled into the light guide, and wherein the microstructure has a plurality of structural elements which are in the form of substantially circular cylindrical elevations.

A microstructure is understood in particular as a targeted structure whose characteristic dimensions are in the micrometre range, i.e. in the range below 1 mm. The microstructure can also be described as a micro-optical structure given that it is responsible for light outcoupling.

The microstructures, for example, have a size of about 50 to 500 μm.

It has been shown that substantially circular cylindrical elevations can effectively outcouple light. The structural elements are preferably each designed with a substantially identical geometry and/or dimensioning. The circular cylindrical elevations have in particular the shape of a straight circular cylinder. The circular surfaces of the circular cylindrical elevations are preferably essentially parallel to the opposite surface of the light guide or the cover layer. The intersecting surfaces can lie directly on the surface of the light guide or the cover layer. The circular cylindrical elevations each have a diameter of at least 20 μm, more preferably at least 40 μm and/or a diameter of at most 200 μm, more preferably at most 100 μm, for example a diameter of 50 μm. The circular cylindrical elevations preferably each have a height of at least 20 μm, more preferably at least 40 μm and/or a height of at most 200 μm, more preferably at most 100 μm, for example a height of 50 μm. For example, the structural elements are spaced at a distance of at least 50 μm, preferably at least 100 μm. In particular, such structural elements can enable a transparent light deflecting device with efficient light outcoupling at the same time. In comparison to cone-shaped structural elements, an advantageous diagonal outcoupling of the light can be achieved.

It is possible that the microstructure is formed jointly by the surface of the light guide, by the surface of the cover layer or by facing surfaces of the light guide and the cover layer.

A flat, transparent light guide is a component that can transport light over a certain distance) The light guide is achieved by reflection at the boundary surface of the light guide, for example total reflection due to a lower refractive index of the medium surrounding the light guide. In this connection, the term "light" is understood to mean the part of electromagnetic radiation visible to the eye, i.e. electromagnetic radiation with wavelengths in the range from about 380 nm to 780 nm or a sub-range thereof) The light guide can be, for example, a window pane or another glass pane. For example, the light guide is designed as an angular, especially rectangular pane. The light guide can be used, for example, as a substrate for the cover layer.

For example, the cover layer applied in a planar manner to the light guide at least partially is only partially applied to the light guide. For example, in the case of a window pane, only the upper area (for example 1 m or 2 m in the upper area) is provided with the cover layer. The cover layer is preferably the outermost layer of the light deflecting device.

Since a cover layer is applied to the light guide, existing light guides in particular (which, for example, do not have a microstructured surface) can be retrofitted by applying a cover layer with the microstructure.

The light deflecting device can thus be used to direct and deflect light in lighting and, in combination with an appropriate light source, enables indirect wide-area lighting even where natural daylight is insufficient. In this respect, daylight supplementary lighting can be created.

In accordance with a preferred embodiment of the first aspect, the microstructure (preferably exclusively) is formed on the surface of the cover layer facing the light guide. The surface of the light guide then requires no microstructure. Due to the fact that the cover layer now has a microstructure on the surface facing the light guide for outcoupling light coupled into the light guide, it is achieved that on the one hand the outcoupling can be achieved as usual by a microstructure, but on the other hand the microstructure is protected by the fact that this is not provided on an outer side, but on the side facing the light guide. This protects the microstructure from external influences. An additional protective layer is not necessary as the cover layer itself can serve as a protective layer. In this respect, the cover layer can also be regarded as an outcoupling layer.

According to a preferred embodiment of the first aspect, the surface of the cover layer opposite the microstructure is essentially flat. In particular, the flat surface runs essentially parallel to the surfaces of the flat light guide. The essentially flat surface of the cover layer can represent an outer side of the light deflecting device in particular and thus represent the outer protective layer or render an additional protective layer unnecessary.

According to a preferred embodiment of the first aspect, the light guide consists at least partially of glass or a plastic. A light guide made of glass has a high hardness and durability. In addition, glass is already used in many building elements, such as windows or showcases in any case. Such light guides can easily be provided with a microstructure by applying the cover layer. Light guides made of plastic can also have a high durability. Examples of plastics are polymethyl methacrylate (PMMA), polysiloxane, such as polydimethylsiloxane (PDMS), polycarbonate (PC), cycloolefin copolymer (COC) or polyurethane (PU).

In principle, the cover layer can be in the form of a slab or sheet. However, according to a preferred embodiment of the different aspects, the cover layer is designed as a film. In particular, a film is a thin sheet (in particular with a thickness of less than 1 mm) of the respective material (e.g. plastic or thin glass). For example, the film can be rolled up. This has the particular advantage that the cover layer can be easily transported as a roll and can, for example, only be applied on site. However, the film still has the advantage of sufficient strength to fulfil the function of a protective layer, for example as an outer layer.

According to a preferred embodiment of the first aspect, the light guide has a thickness of at least 1 mm, preferably at least 2 mm, more preferably at least 3 mm and/or a thickness of at most 15 mm, preferably at most 10 mm, more preferably at most 8 mm. At these minimum thicknesses, sufficient stability of the light deflecting device can be achieved and the light can be incoupled.

According to a preferred embodiment of the first aspect, the cover layer consists at least partially of glass or a plastic. It has been shown that embodiments of the cover layer according to the invention can be advantageously made of glass or a plastic. A plastic has proven to be particularly advantageous in the formation of the cover layer as a film. In particular, a plastic can be a transparent thermoplastic material. The plastic is, for example, polymethyl methacrylate (PMMA), polysiloxane, such as polydimethylsiloxane (PDMS), polycarbonate (PC), cycloolefin copolymer (COC) or polyurethane (PU). However, it is also conceivable that the cover layer is made of a transparent epoxy resin or acrylate. However, the cover layer can also be made of glass, in particular thin glass.

According to a preferred embodiment of the first aspect, the cover layer shall have a thickness of at most 1000 µm, preferably at most 500 µm, more preferably at most 300 µm and/or a thickness of at least 50 µm, preferably at least 100 µm, more preferably at least 150 µm.

The thickness of the cover layer is understood in particular as the thickness including the microstructure. It has been shown that even a cover layer whose microstructured surface is applied to the light guide can be comparatively thin and also perform a sufficient protective function.

In accordance with a preferred embodiment of the first aspect, the cover layer is firmly bonded to the light guide. For example, the cover layer is laminated to the light guide, glued to the light guide or welded to the light guide. In the case of bonding, it is preferable to use an adhesive that is as transparent as possible and causes as little scattering of light as possible.

In accordance with a preferred embodiment of the first aspect, the structural elements are designed in such a way that light coupled into the light guide is essentially outcoupled via the cylinder lateral surfaces of the structural elements. In this way, as much of the light as possible can be outcoupled from the light guide in a controlled manner with little or no loss of light.

According to a preferred embodiment of the first aspect, the angle enclosed by the height and the diagonal cross-section of the structural elements is less than or equal to the critical angle of total reflection in the light guide and/or the cover layer. A critical angle of total reflection is the angle of incidence at which a total reflection occurs at the interface of two (ideally non-absorbent) media with different propagation speeds. In this way, as much of the light as possible can be outcoupled from the light guide in a controlled manner, as the side wall of the circular cylindrical structural elements is effectively used for light outcoupling.

According to a preferred embodiment of the first aspect, the structural elements of the microstructure exhibit an essentially constant arrangement density. The structural elements can be arranged regularly or stochastically distributed. The microstructure can be produced particularly economically due to an essentially constant arrangement density. The susceptibility to errors with regard to incorrect positioning is also reduced for applying the cover layer to the light guide.

In accordance with a preferred embodiment of the first aspect, one edge of the light guide whose purpose is for incoupling has a surface modification. By modifying the surface of one edge of the light guide, the efficiency of incoupling the light in the light guide can be increased. The surface modification can be achieved by the edge of the light guide itself or by an element applied to the edge. A surface modification is essentially understood to mean that the surface is modified in such a way that an optical property can be specifically provided.

The surface modification includes, for example, a surface structuring of the edge. For example, the surface modification includes a moth-eye structure. For example, the surface modification includes an (applied) diffraction grating so that a deflection of the light entering from a specific angle range is achieved. For example, the surface modification includes a convex or prismatic shaping of the edge of the light guide. For example, the surface modification includes a cylindrical lens array or a prism array.

As a result, the reflection losses can be reduced by individual embodiments, so that an efficient incoupling of the light is achieved. Also, embodiments can achieve a reduction of an unintentional exceeding of the critical angle of total reflection. Also, embodiments can achieve a reduction of the incoupling of light parallel to the flat surfaces of the light guide.

The described structuring can also be provided at the edge of the light guide opposite the edge serving for incoupling, especially in combination with a mirroring.

According to a preferred embodiment of the first aspect, the microstructure is produced by profile rollers, in particular by UV embossing by means of an embossing roller. The microstructure can, for example, be moulded into the still soft plastic material by means of appropriately shaped rollers. It has been shown that UV embossing using an embossing roller can reliably produce the cover layer as a comparatively thin layer or film (especially in the order of 200 µm and below). An exemplary UV embossing process using an embossing roller can in particular be designed as a "roll-to-roll" process. An (unstructured) substrate (film substrate) can be made available on a roll and provided with the microstructure in a continuous process and then rolled up again. The embossing roll can be structured by a photolithographic or diamond cutting process so that the embossing roll has the negative structure of the microstructure to be produced. For example, the microstructure is embossed with the roller into a lacquer layer on the substrate and simultaneously or subsequently UV cured.

However, it is also conceivable that UV embossing is carried out on rigid substrates. For example, a master film with the negative structure of the microstructure is used and embossed onto a UV lacquer layer on a rigid substrate.

Furthermore, it is conceivable to produce a cover layer with a microstructure in the form of a plate or film by means of extrusion technology using appropriately profiled nozzles, hot stamping technology (so-called "plate-to-plate" process) or casting technology.

According to a second aspect of the invention, a lighting device is described comprehensively: a light deflecting device according to the first aspect of the invention, and an light source arranged at an edge of the light guide for incoupling light via the edge of the light guide.

The lighting device may, for example, be regarded as a transparent, disc-shaped lighting element. A light source is understood to mean at least one light source. For example, a light source may have one or more light sources, such as one or more light-emitting diodes (LEDs). For example, a strip of several light sources (e.g. several LEDs) can be arranged along the edge of the light guide. For example, light-emitting diodes are provided for red, green, blue and/or white light. For example, at least one light source is designed to generate light with a colour temperature range of 5000 K -6500 K (cold white) and/or 3000 K-4000 K (warm white). For example, at least one light source is designed to generate light with an illuminance of more than 500 lx, preferably more than 1000 lx. This (high) colour temperature and/or (high) illuminance can advantageously simulate daylight and, for example, suppress the sleep hormone melatonin.

The light emitted by a light source arranged at one edge of the light guide may, in particular, have an diagonal beam direction (e.g. between 0° and 90°, preferably between 20° and 70°, more preferably between 30° and 50°, e.g. at about 40°) to the flat light guide. Depending on the edge at which the light source is arranged and how the lighting device is arranged in the room, the direction of radiation can then be achieved, for example, diagonally downwards, diagonally upwards or diagonally sideways.

According to an embodiment of the second aspect, the structural elements of the microstructure exhibit, at least in some areas, an essentially increasing arrangement density with increasing distance from at least one light source. In principle, the incoupled light should be outcoupled as far as possible during a passage of the light guide. The proposed embodiment can increase the output of the outcoupled light and achieve a high homogeneity of the light radiation. If, for example, one light source is provided at each of two opposite edges, it would be advantageous to provide the highest arrangement density in the middle between the two light sources.

According to an embodiment of the second aspect, the light source is at least partially applied to the edge of the light guide. In particular, the light source is (at least partially) not at a distance from the edge of the light guide. For example, the light source (e.g. a light-emitting diode) is positively connected to the edge of the material. In particular, this can reduce losses when the light is incoupled. Alternatively, the light source can also be positioned at a distance (e.g. with an air gap) from the edge. This can be advantageous in order to achieve a higher incoupling efficiency by targeted refraction of light.

In accordance with an embodiment of the second aspect, the lighting device comprises: a first light source arranged at a first edge of the light guide for incoupling light via the first edge of the light guide, and a second light source arranged at a second edge of the light guide for incoupling light via the second edge of the light guide.

The provision of a first and a second light source at different edges allows flexible room lighting through the lighting device. For example, the first light source has a different radiation characteristic (e.g. in relation to the brightness and/or colour temperature of the light source) than the second light source. For example, a light source arranged at the upper edge of the light guide can radiate light with a colour temperature range of 5000 K-6500 K (cold white) or 3000 K-4000 K (warm white) and high illuminance (e.g. 1000 lx) diagonally downwards (e.g. for table lighting). Alternatively or additionally, bright, cold light (5000 K-6500 K) can be emitted diagonally upwards (e.g. for room lighting) by a light source arranged at the lower edge of the light guide.

To further improve the adaptability and flexibility of the lighting device, the lighting device preferably has a third light source arranged at a third edge of the light guide for incoupling light via the third edge of the light guide. Furthermore, the lighting device may include a fourth light source arranged at a fourth edge of the light guide for incoupling light via the fourth edge of the light guide. This enables a high lighting flexibility especially with rectangular light guides, which are used for example in or as part of a window.

According to a third aspect of the invention, a use of a light deflecting device according to the first aspect or a lighting device according to the second aspect is also described for a room-forming structural element, in particular a window, a partition, a parapet or a ceiling element, or for a room lamp.

It has been shown that the described light deflecting device and the described lighting device are suitable for use in the described structural elements or room lighting fixtures or as the described structural elements or room lighting fixtures, since such applications generally require a high level of durability with economical installation and high efficiency and adaptability of the lighting are also expected.

A multi-pane insulating glass (MIG) is particularly suitable as a window. The light guide can then, for example, be one of the panes of the multi-pane insulating glass or be arranged in an intermediate space of the multi-pane insulating glass. The lighting device can also be installed in front of a window (e.g. from the inside) or behind a window (e.g. from the outside). In this respect, the cover layer can serve as an outer protective layer.

The exemplary embodiments of the present invention previously described in this description should also be understood as being disclosed in all combinations with each other. In particular, exemplary embodiments in relation to the various aspects are to be deemed disclosed.

Further advantageous exemplary embodiments of the invention can be drawn from the following detailed description of a number of exemplary embodiments of the invention, in particular in combination with the drawings. However, the drawings are only intended to be used for illustration purposes and not to define the scope of protection of the invention. The drawings are not true to scale and are simply intended to reflect in exemplary form the general concept of the present invention. In particular, features contained in the drawings should in no way be deemed a necessary element of the present invention.

DETAILED DESCRIPTION

Figure 1A:
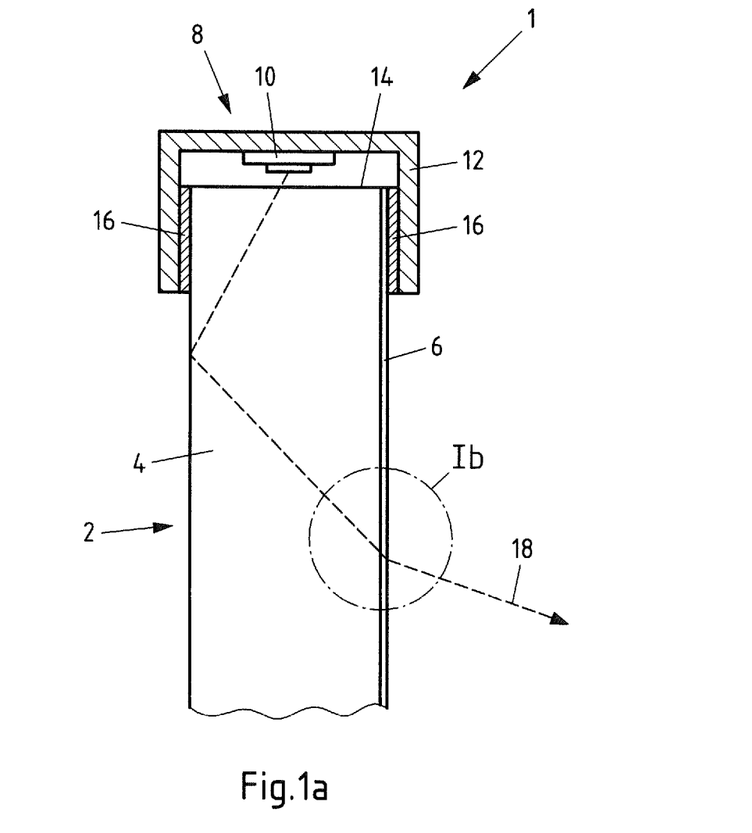
FIGS. 1a,b show a sectional view of an embodiment of a lighting device according to the invention comprising an embodiment of a light deflecting device according to the invention.

FIG. 1a first shows a sectional view of an embodiment of a lighting device according to the invention 1 including an embodiment of a light deflecting device according to the invention 2. The light deflecting device 2 comprises a flat, transparent light guide 4 and a transparent cover layer 6 applied to at least some areas of the light guide 4. The light guide 4 can, for example, be made of glass or a transparent plastic. The cover layer 6 can also be made of glass or a transparent plastic, for example. The lighting device 1 also has a light source 8 comprising at least one light emitting diode 10. The light source 8 is arranged by means of a holder 12 at an edge 14 of the light guide 4 for the incoupling of light via the edge 14 of the light guide 4. To prevent light from being outcoupled in the area of the holder 12 or to ensure that outcoupled light is incoupled again, a mirroring 16 is provided in the area of holder 12. An exemplary course of a light beam 18, which is incoupled from the light emitting diode 10 into the light guide 4, is totally reflected once and then outcoupled via the cover layer 6, is also shown.

Figure 1B:
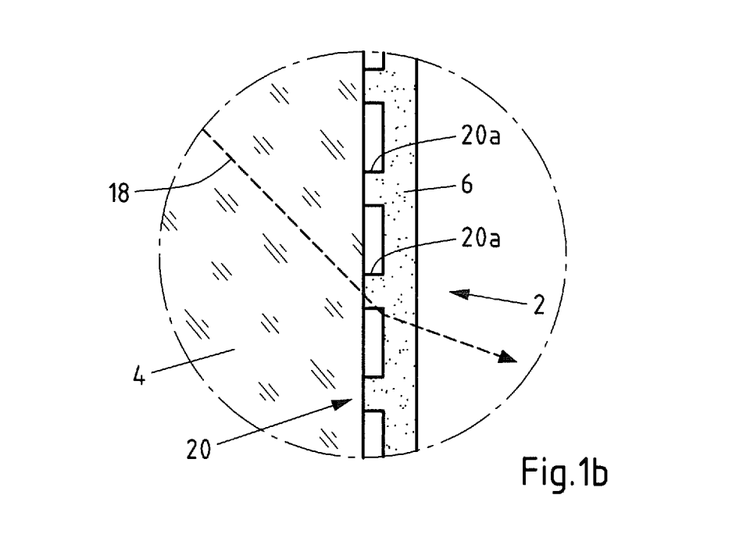

FIG. 1b shows an enlarged sectional view of the area of the separate cover layer 6 from FIG. 1a. The microstructure is formed between the light guide 4 and the cover layer 6, which serves as the outcoupling layer. For this purpose, the cover layer 6 on the surface facing the light guide 4 has a microstructure 20 for outcoupling light coupled into the light guide 4. The surface of cover layer 6 opposite the microstructure 20 is essentially flat. If the cover layer 6 is designed as a film, it can be easily transported and applied to the light guide 4. The cover layer 6 is bonded to the light guide 4, e.g. laminated or glued to it.

The microstructure 20 has a large number of structural elements 20a, which are designed in particular as essentially circular cylindrical elevations. In the area of the circular intersecting surfaces of the elevations 20a, the cover layer 6 rests on the light guide 4 or is connected to it. Also shown in FIG. 1b is the exemplary light beam 18, which is outcoupled due to one of the structural elements 20a. In this case, the structural elements 20a of the microstructure 20 exhibit an essentially constant arrangement density. However, it is also conceivable that the structural elements 20a of the microstructure 20 may, at least in some areas, have an essentially increasing arrangement density with increasing distance from the light source 8, i.e. the distance between the structural elements becomes smaller with increasing distance from the light source 8. The microstructure 20 is not exposed to any risk of contamination or damage, as only the flat surface of the cover layer 6 opposite the microstructure 20 is exposed to the environment.

Figure 2:
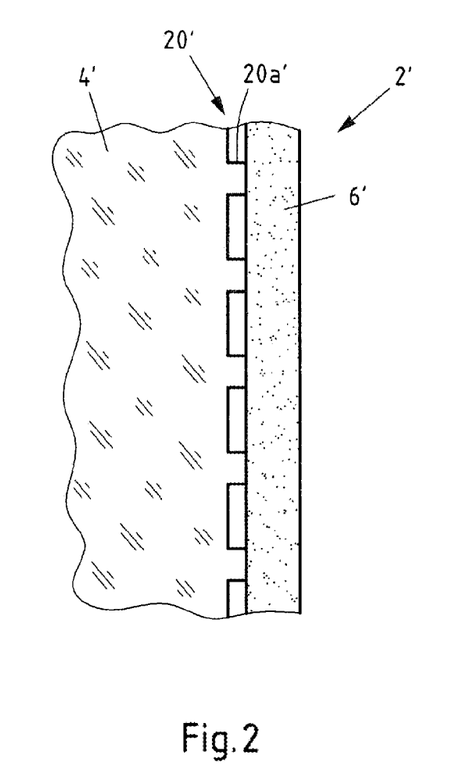
FIG. 2 shows a sectional view of an alternative embodiment of a light deflecting device according to the invention.

FIG. 2 shows a sectional view of an alternative embodiment of a light deflecting device 2' according to the invention, which, however, can be used and designed in the same way as the light deflecting device 2'. The microstructure in the light deflecting device 2' is not provided by a cover layer, which has the microstructure on the surface facing the light guide, but by the light guide 4'.

For the light deflecting device 2', the microstructure 20' with the elevations 20a' is provided by the surface of the light guide 4'. To protect the microstructure, a separate cover layer 6 is provided, which rests on the circular intersecting surfaces.

FIG. 3 shows sectional views of different embodiments to illustrate different light incouplings into a light guide.

Figure 3A:
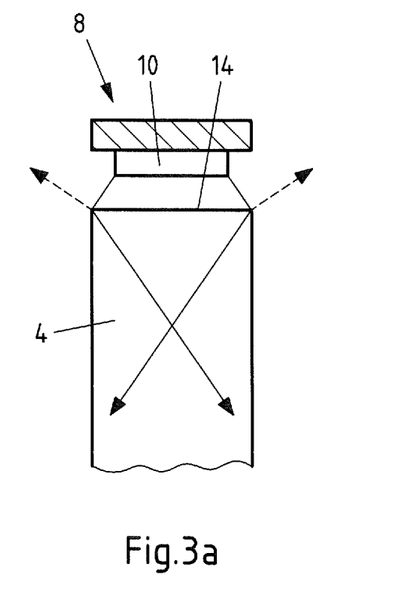
FIGS. 3a-3h shows sectional views of different embodiments to illustrate different light couplings into a light guide.

In FIG. 3a, an edge 14 of a light guide 4 is shown first, with the light emitting diode 10 of the light source 8 being at a distance from the edge 14. The light rays shown as examples illustrate that although some of the light is incoupled, some of the light is also reflected undesirably.

Figure 3B:
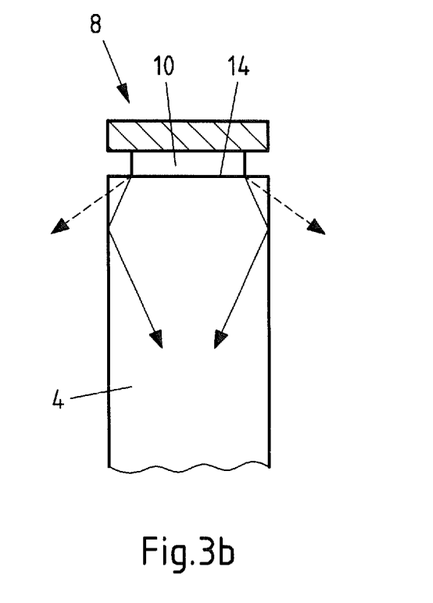

FIG. 3b shows an embodiment in which the light source 8 with the light emitting diode 10 is mounted directly on the edge 14 of the light guide 4, at least partially. This prevents unwanted reflections. Light that is not totally reflected can, for example, be reflected back into the light guide 4 by means of the mirroring 16 shown in FIG. 1a.

Figure 3C:
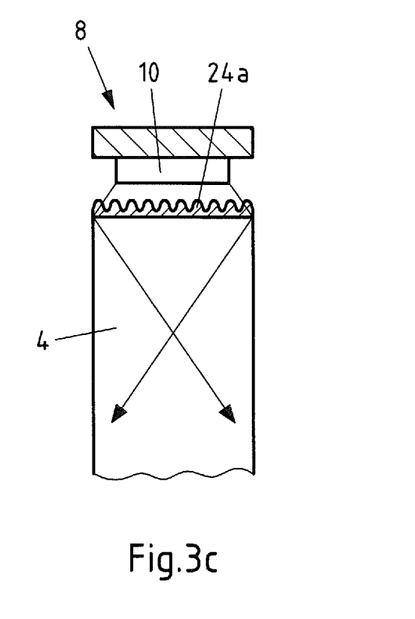
Figure 3D:
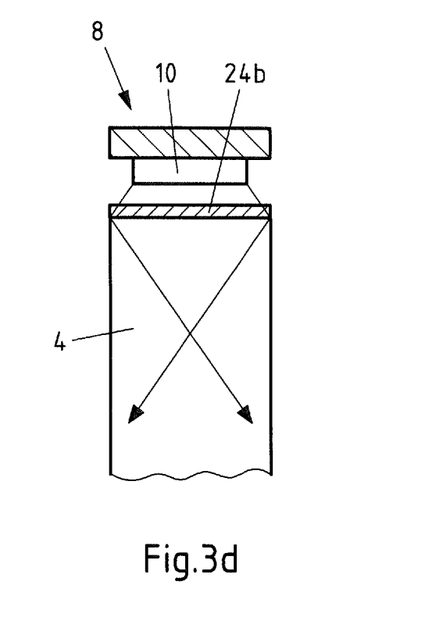

FIG. 3c shows a surface modification of the edge 14 of the light guide 4 in the form of a moth-eye structure 24a arranged on the edge 14, while FIG. 3d shows a surface modification of the edge 14 of the light guide 4 in the form of a diffraction grating 24b arranged on the edge 14. This can prevent or reduce unwanted reflections in particular.

Figure 3E:
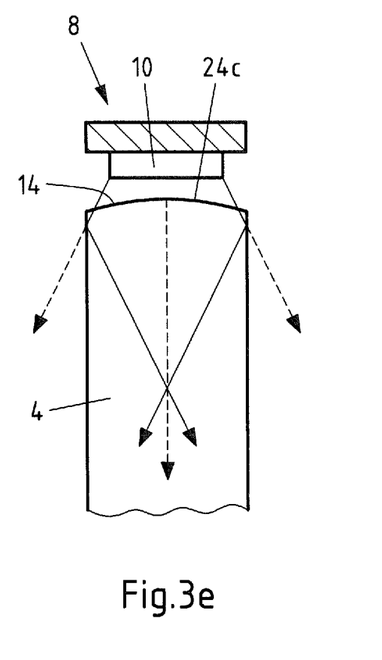
Figure 3F:
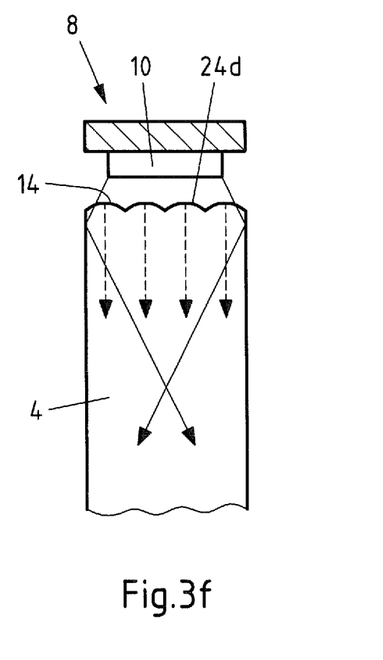
Figure 3G:
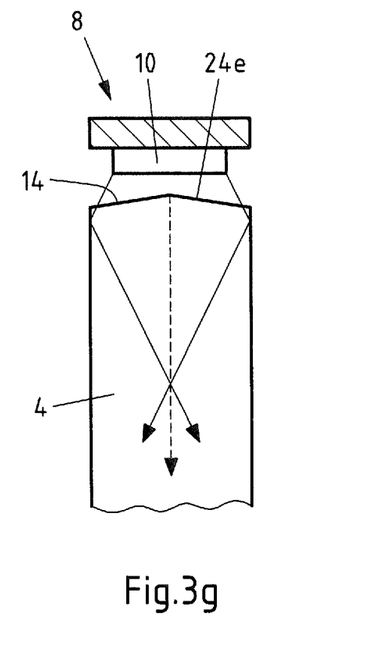
Figure 3H:
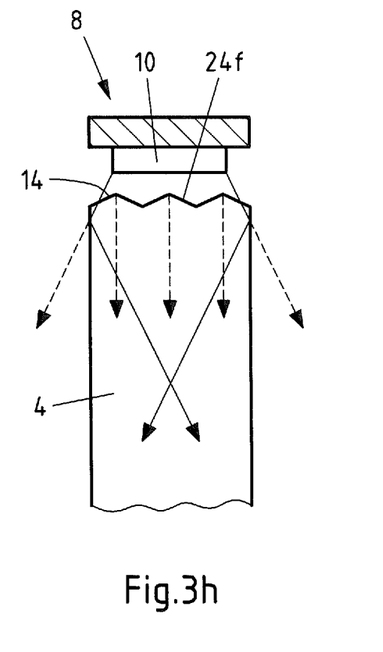

FIG. 3e shows a convex shape 24c of edge 14 of the light guide 4, while FIG. 3f shows an edge 14 shaped as a cylindrical lens array 24d. FIG. 3e shows a prismatic formation 24e of the edge 14 of the light guide 4, while FIG. 3f shows an edge 14 formed as a prism array 24f. In particular, this can prevent or reduce the exceeding of the critical angle of total reflection of the incoupled light in the light guide.

Figure 4:
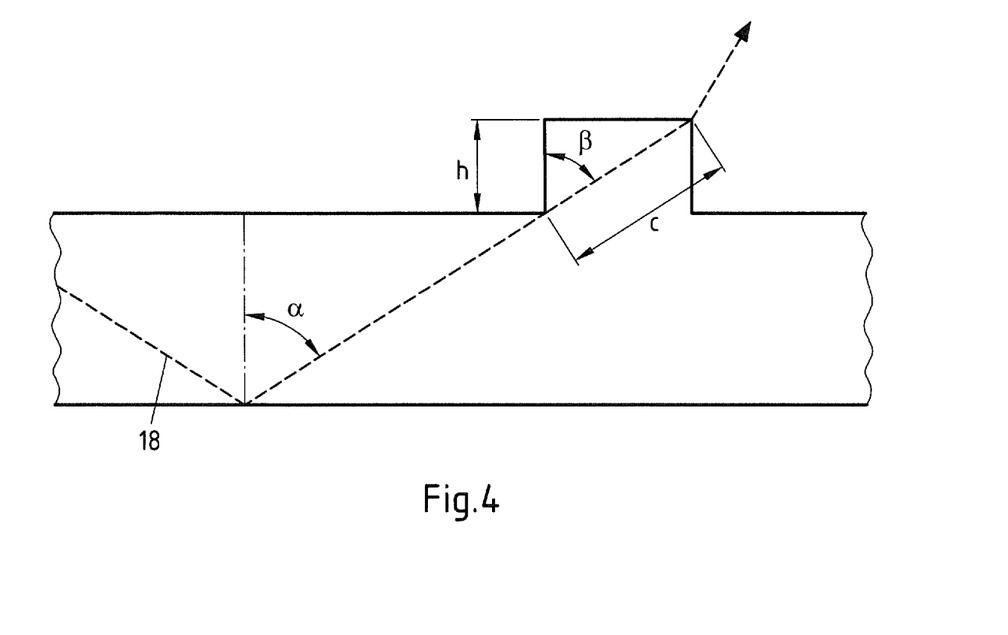
FIG. 4 shows an enlarged cross-sectional view of an embodiment of a microstructure according to the invention.

FIG. 4 shows an enlarged cross-sectional view of an embodiment of a microstructure according to the invention as it can be used in the embodiments of FIG. 1 or 2. FIG. 4 illustrates how a light incoupled in a light guide is outcoupled from a circular cylindrical structural element 20a of a microstructure 20. In this case, the microstructure 20 is provided by the surface of the light guide. However, the example can also be transferred to the light deflecting device 2 with the cover layer 6 from FIG. 1b. The light beam 18 shown as an example is first totally reflected, in this example at the critical angle α. Then the light beam propagates through the circular cylindrical structural element 20a of the microstructure. The angle β of the triangle formed by h, c and the circular intersecting surface is less than or equal to the critical angle α of the total reflection in the light guide, enclosed by the height h and the cross-sectional diagonal c of the structural element 20a. An impact of the light beam on the circular intersecting surface which would result in a total reflection and an uncontrolled outcoupling is avoided. In this case, the light beam 18 runs along the cross-sectional diagonals and is then outcoupled.

Figure 5:
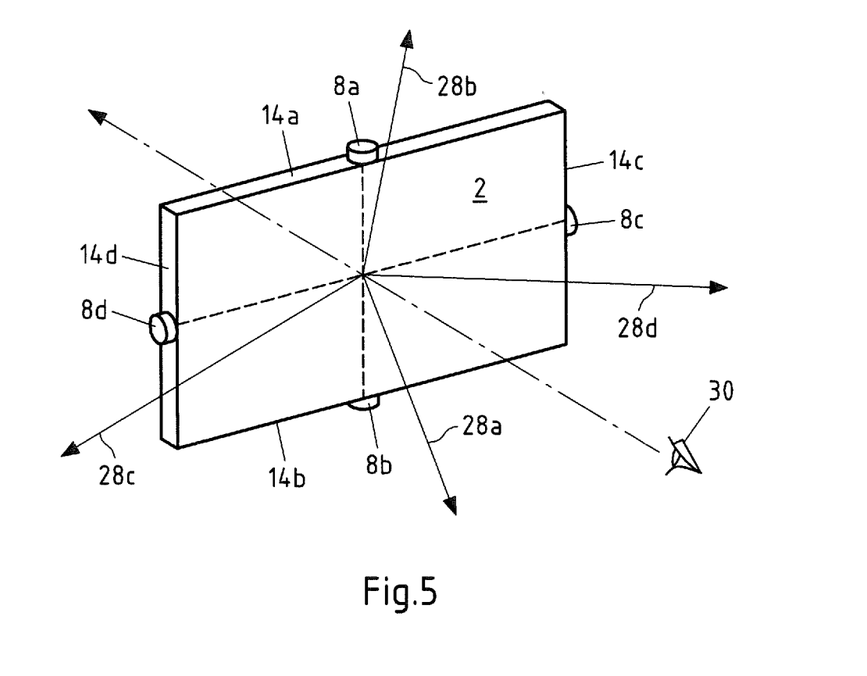
FIG. 5 shows a perspective representation of an embodiment of the exemplary lighting device from FIG. 1.

FIG. 5 shows a perspective representation of an embodiment of the exemplary lighting device 1. As can be seen, in this case the lighting device 1 has a total of four light sources 8a, 8b, 8c, 8d in addition to the light deflecting device 2. At each of the four edges 14a, 14b, 14c, 14d of the light guide 4 a light source 8a, 8b, 8c, 8d is arranged for the incoupling of light through the respective edge of the light guide. This allows light to be outcoupled independently of one another in the four directions 28a, 28b, 28c and 28d at an angle to the light guide. Lighting device 1 can thus provide lighting, while at the same time a user 30 can look through the light deflecting device 2 of lighting device 1.

Figure 6:
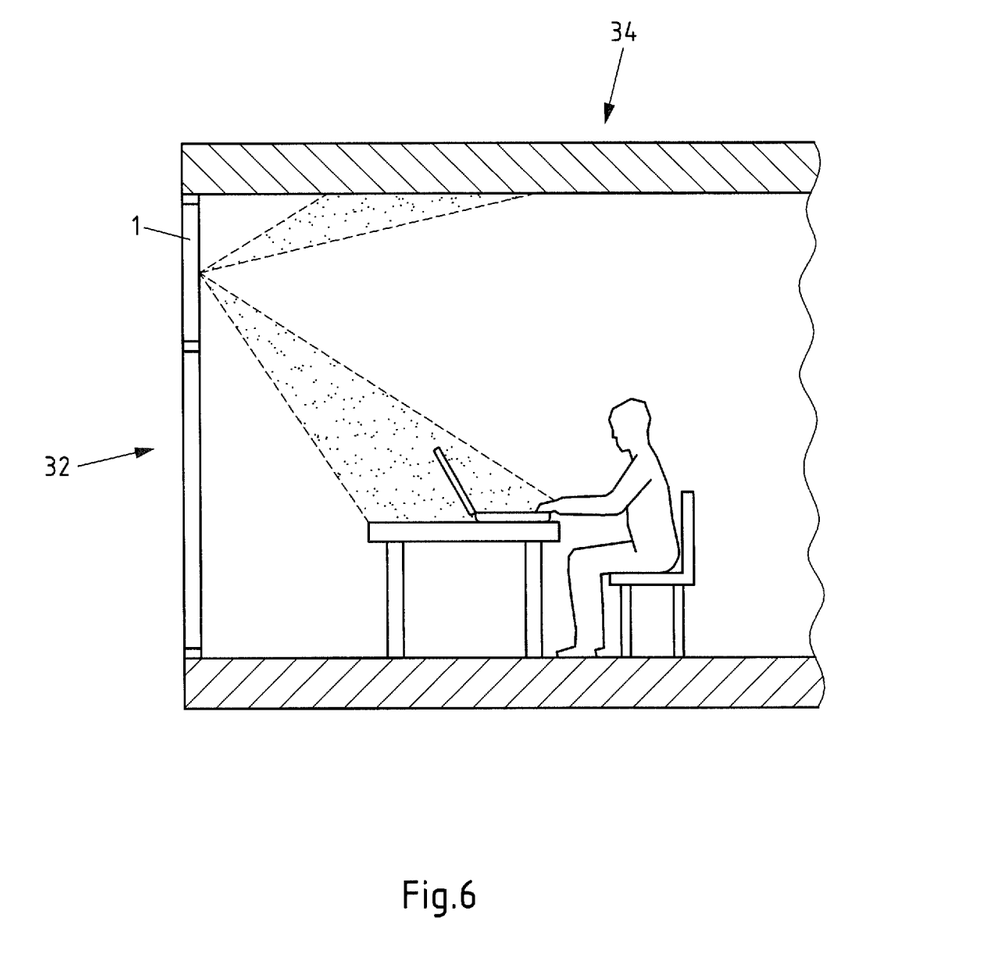
FIG. 6 shows a representation of an exemplary use of the exemplary lighting device from FIG. 1.

Finally, FIG. 6 shows an illustration of an exemplary use of the exemplary lighting device 1. The lighting device 1 is used for a space-forming component, in this case a window. The lighting device 1 is provided in an upper part of a window 32 of a room 34. The lighting device 1 can be part of window 32 or placed in front of window 32 by means of a frame. Lighting device 1 emits light with a warm white colour temperature and high illuminance (e.g. 1000 lx) diagonally downwards through a light source arranged at the upper edge of the light guide. In addition, a light source arranged at the lower edge of the light guide can emit bright, cold light diagonally upwards.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A window pane comprising a light deflecting device, the light deflecting device comprising:
    a flat, transparent light guide, and
    a transparent cover layer which is applied to the light guide in a flat manner at least partially,
    wherein a microstructure is formed between the light guide and the cover layer for outcoupling light incoupled into the light guide and wherein the microstructure comprises a plurality of structural elements which are formed as circular cylindrical elevations, wherein the microstructure is formed on the surface of the cover layer facing the light guide, wherein the angle included by the height and the cross-sectional diagonal of the structural elements is smaller than or equal to the critical angle of the total reflection in the light guide and/or the cover layer, wherein the circular surfaces of the circular cylindrical elevations lie directly on the surface of the light guide, wherein the circular cylindrical elevations each have a diameter of at least 20 μm and at most 100 μm and a height of at least 20 μm and at most 10 μm, and wherein the structural elements are designed in such a way that light coupled into the light guide is substantially outcoupled at the cylinder lateral surfaces of the structural elements.

2. The window pane according to claim 1, wherein the surface of the cover layer opposite the microstructure is substantially flat.

3. The window pane according to claim 1, wherein the light guide consists at least partially of glass or a plastic.

4. The window pane according to claim 1, wherein the cover layer is formed as a film.

5. The window pane according to claim 1, wherein the light guide has a thickness of at least 1 mm, preferably at least 2 mm, more preferably at least 3 mm and/or a thickness of at most 15 mm, preferably at most 10 mm, more preferably at most 8 mm.

6. The window pane according to claim 1, wherein the cover layer consists at least partially of glass or a plastics material.

7. The window pane according to claim 1, wherein the cover layer has a thickness of at most 1000 μm, preferably at most 500 µm, more preferably at most 300 µm and/or a thickness of at least 50 µm, preferably at least 100 µm, more preferably at least 150 µm.

8. The window pane according to claim 1, wherein the cover layer is positively connected to the light guide.

9. The window pane according to claim 1, wherein the structural elements of the microstructure have a substantially constant arrangement density.

10. The window pane according to claim 1, wherein an edge of the light guide intended for incoupling has a surface modification.

11. The window pane according to claim 1, wherein the microstructure is produced by means of profile rollers, in particular by means of UV embossing by means of an embossing roller.

12. A window pane comprising a lighting device, the lighting device comprising:
   a light deflecting device, the light deflecting device comprising a flat, transparent light guide, and a transparent cover layer which is applied to the light guide in a flat manner at least partially; and
   a light source arranged at an edge of the light guide for incoupling light via the edge of the light guide,
   wherein a microstructure is formed between the light guide and the cover layer for outcoupling light incoupled into the light guide and wherein the microstructure comprises a plurality of structural elements which are formed as circular cylindrical elevations, wherein the microstructure is formed on the surface of the cover layer facing the light guide, wherein the angle included by the height and the cross-sectional diagonal of the structural elements is smaller than or equal to the critical angle of the total reflection in the light guide and/or the cover layer, wherein the circular surfaces of the circular cylindrical elevations lie directly on the surface of the light guide, wherein the circular cylindrical elevations each have a diameter of at least 20 µm and at most 100 µm and a height of at least 20 µm and at most 100 µm, and wherein the structural elements are designed in such a way that light coupled into the light guide is substantially outcoupled at the cylinder lateral surfaces of the structural elements.

13. The window pane according to claim 12, wherein the structural elements of the microstructure at least partially have an arrangement density which increases substantially with increasing distance from at least one light source.

14. The window pane according to claim 12, the lighting device comprising:
   a first light source arranged at a first edge of the light guide for incoupling light via the first edge of the light guide, and
   a second light source arranged at a second edge of the light guide for incoupling light via the second edge of the light guide.

15. The window pane according to claim 13, wherein the light source is applied at least partially to the edge of the light guide.

* * * * *

UNITED STATES PATENT AND TRADEMARK OFFICE
CERTIFICATE OF CORRECTION

PATENT NO. : 11,808,967 B2
APPLICATION NO. : 16/376782
DATED : November 7, 2023
INVENTOR(S) : Andreas Neyer et al.

It is certified that error appears in the above-identified patent and that said Letters Patent is hereby corrected as shown below:

In the Claims

Column 10, Line 47, Claim 1, reads:
"at most 10 μm, and wherein the structural elements are"

And should read:
--at most 100 μm, and wherein the structural elements are--

Signed and Sealed this
Twelfth Day of December, 2023

Katherine Kelly Vidal
*Director of the United States Patent and Trademark Office*